United States Patent
Wu

(10) Patent No.: US 9,973,440 B2
(45) Date of Patent: May 15, 2018

(54) RESOURCE NOTIFICATION METHOD, DEVICE AND SYSTEM

(71) Applicant: ZTE CORPORATION, Shenzhen, Guangdong Province (CN)

(72) Inventor: Hao Wu, Shenzhen (CN)

(73) Assignee: ZTE CORPORATION (CN)

( * ) Notice: Subject to any disclaimer, the term of this patent is extended or adjusted under 35 U.S.C. 154(b) by 0 days. days.

(21) Appl. No.: 15/305,980

(22) PCT Filed: Jul. 16, 2014

(86) PCT No.: PCT/CN2014/082359
§ 371 (c)(1),
(2) Date: Oct. 21, 2016

(87) PCT Pub. No.: WO2015/161572
PCT Pub. Date: Oct. 29, 2015

(65) Prior Publication Data
US 2017/0048160 A1    Feb. 16, 2017

(30) Foreign Application Priority Data
Apr. 24, 2014 (CN) .......................... 2014 1 0168463

(51) Int. Cl.
*H04L 12/911* (2013.01)
*H04L 12/58* (2006.01)
(Continued)

(52) U.S. Cl.
CPC .............. *H04L 47/70* (2013.01); *H04L 51/24* (2013.01); *H04L 67/10* (2013.01); *H04L 67/16* (2013.01);
(Continued)

(58) Field of Classification Search
None
See application file for complete search history.

(56) References Cited

U.S. PATENT DOCUMENTS

2015/0012551 A1* 1/2015 Dong .................... H04W 4/005
  707/755
2016/0219125 A1    7/2016 Xiao

FOREIGN PATENT DOCUMENTS

CN            1960575 A    5/2007
CN          101257455 A    9/2008
(Continued)

OTHER PUBLICATIONS

OneM2M Functional Architecture Intrim Draft; Feb. 26, 2014.*
(Continued)

*Primary Examiner* — Angela Nguyen
(74) *Attorney, Agent, or Firm* — Plumsea Law Group, LLC

(57) ABSTRACT

The embodiments of the present document disclose a resource notification method, device and system. The method includes: receiving, by a local Common Service Entity (CSE), first indication information transmitted by an Application Entity (AE) of an application node, herein the first indication information includes an identity of a remote CSE which needs to be notified and an address of an original resource; and finding, by the local CSE, a search tag attribute of the original resource according to the address of the original resource in the first indication information, and making a response to the first indication information according to a state of the search tag attribute.

13 Claims, 4 Drawing Sheets

(51) Int. Cl.
   *H04L 29/08* (2006.01)
   *H04W 4/00* (2018.01)
   *H04W 24/02* (2009.01)

(52) U.S. Cl.
   CPC ............. *H04L 67/12* (2013.01); *H04W 4/005* (2013.01); *H04W 24/02* (2013.01)

(56) References Cited

FOREIGN PATENT DOCUMENTS

| | | |
|---|---|---|
| CN | 103618800 A | 3/2014 |
| EP | 3043530 A1 | 7/2016 |
| WO | 2014037055 A1 | 3/2014 |

OTHER PUBLICATIONS

International Search Report and Written Opinion dated Jan. 26, 2015 in PCT Application No. PCT/CN2014/082359.
European Search Report dated Feb. 27, 2017 for EP Application No. 14890393.3.
OneM2M—Technical Specification; Richard Brennan-Co-Rapporteur et al: "oneM2M Functional Architecture Baseline Draft" oneM2M-TS-0001—V-0.4.2ed Editor's Note Review, Mar. 27, 2014.
OneM2M—Technical Specification; Rajesh Bhalla (Rapporteur) et al: "CSF Descriptions", Aug. 7, 2013.

\* cited by examiner

RESOURCE NOTIFICATION METHOD, DEVICE AND SYSTEM

CROSS-REFERENCE TO RELATED APPLICATION(S)

This application is the U.S. National Phase application of PCT application number PCT/CN2014/082359 having a PCT filing date of Jul. 16, 2014, which claims priority of Chinese patent application 201410168463.9 filed on Apr. 24, 2014, the disclosures of which are hereby incorporated by reference.

TECHNICAL FIELD

The present document relates to a communication technology, in particular to a resource notification method, device and system.

BACKGROUND OF RELATED ART

A Machine to Machine (M2M) communication network includes an application node, an intermediate node and a base node. Herein the application node may be an execution node at an end, such as a smart electricity meter, a temperature sensing and control sensor, a fire alarm or a smart domestic electrical appliance and so on. The intermediate node may be an intermediate network element connecting the execution node at the end to a network side server, such as a gateway. The base node may be a network side server, and an application registered to the base node may be a management platform of an M2M service provider.

At present, in the existing art, when the base node needs to find a resource at the application node, query requests need to be transmitted to all intermediate nodes connected to the base node and the intermediate nodes forward the query requests to various application nodes. In order to facilitate an Application Entity (AE) at the intermediate node to be able to find the resource at the application node, usually a resource notification mode is adopted. That is, a notification resource corresponding to the resource at the application node is created at the intermediate node. Herein, the notification resource has a same search tag as an original resource and a link of the original resource, such that the intermediate node can conveniently find the original resource which is needed, and access the original resource according to the link. Herein the search tag is a keyword for retrieving the resource and may be considered as an identity for distinguishing different resources. In addition, for the application node, a Common Service Entity (CSE) of the intermediate node to which the AE at the application node has been registered may be called a local CSE; and other CSEs of the intermediate node and the base node to which the AE at the application node has not registered may be called remote CSEs.

However, in the existing art, the attribute of the search tag is an optional attribute. In one aspect, once the attribute does not exist, a creation notification resource request transmitted by the local CSE to the remote CSE cannot contain the attribute of "search tag". In another aspect, for the notification resource, this attribute is mandatory. If the creation request does not contain this attribute, the remote CSE cannot create a notification resource for the original resource, consequently an insignificant notification resource will be created at the local CSE, unnecessary storage space waste will be caused and a notification resource creation failure will occur at the remote CSE.

SUMMARY

In order to solve the technical problem, the embodiments of the present document are expected to provide a resource notification method, device and system, which not only can avoid that an insignificant original resource is created at a local CSE, but also can avoid unnecessary storage space waste, and also avoid a situation that notification resource creation failure occurs at the remote CSE.

The technical solution of the embodiments of the present document is implemented as follows:

In a first aspect, the embodiment of the present document provides a resource notification method, including:

receiving, by a local Common Service Entity (CSE), first indication information transmitted by an Application Entity (AE) of an application node, herein the first indication information includes an identity of a remote CSE which needs to be notified and an address of an original resource; and finding, by the local CSE, a search tag attribute of the original resource according to the address of the original resource in the first indication information, and making a response to the first indication information according to a state of the search tag attribute.

Preferably, according to a first possible implementation mode, in combination with the first aspect, finding, by the local CSE, a search tag attribute of the original resource according to the address of the original resource in the first indication information, and making a response to the first indication information according to a state of the search tag attribute includes:

when the search tag attribute is in an invalid state, the local CSE transmitting a response message to the AE, herein the response message is used for indicating that a notification of the original resource fails, or a creation of an attribute of the original resource fails, or an updating of the attribute of the original resource fails;

when the search tag attribute is in a valid state, the local CSE transmitting a resource creation request to the remote CSE, herein the resource creation request includes the address of the original resource and the search tag attribute of the original resource.

Preferably, the search tag attribute is in the invalid state including at least one of the following: the original resource not having the search tag attribute, an attribute value of the search tag attribute being empty and the attribute value of the search tag attribute being an abnormal value.

Preferably, according to a second possible implementation mode, in combination with the first aspect, after the local CSE receives the first indication information, the method further includes: finding whether the original resource has a first indication attribute according to the address of the original resource, herein the first indication attribute represents an identity of a remote CSE which has been notified about the original resource;

when finding that the original resource does not have the first indication attribute, the local CSE creating the first indication attribute for the original resource, and using the identity of the remote CSE which needs to be notified in the first indication information as the identity of the remote CSE which has been notified about the original resource in the first indication attribute; and when finding that the original resource has the first indication attribute, the local CSE updating the identity of the remote CSE which has been notified about the original resource in the first indication attribute to be the identity of the remote CSE which needs to be notified in the first indication information.

Preferably, according to a third possible implementation mode, in combination with the first aspect, the method further includes:

when the local CSE finds that the search tag attribute of the original resource is deleted or emptied, continuously finding a first indication attribute of the original resource; and when the first indication attribute is non-empty, the local CSE transmitting a deletion request to the remote CSE which has been notified according to the identity of the remote CSE which has been notified about the original resource in the first indication attribute.

Preferably, the deletion request includes the search tag of the original resource which is notified to the remote CSE, such that the remote CSE finds and deletes the original resource which has been notified according to the search tag.

Preferably, according to a fourth possible implementation mode, in combination with the third aspect, the method further including:

receiving, by the local CSE, an original resource updating request transmitted by the AE of the application node; and when the updating request indicates the local CSE to delete or empty the search tag attribute of the original resource, deleting or emptying, by the local CSE, the search tag attribute of the original resource according to an indication in the updating request; or, deleting or emptying, by the local CSE, the search tag attribute of the original resource according to preset rules or policies.

In a second aspect, the embodiment of the present document provides a resource notification device, including: a receiving unit, a finding unit and a response unit, herein, the receiving unit is configured to receive first indication information transmitted by an Application Entity (AE) of an application node, herein the first indication information includes an identity of a remote CSE which needs to be notified and an address of an original resource;

the finding unit is configured to find a search tag attribute of the original resource according to the address of the original resource in the first indication information; and the response unit is configured to make a response to the first indication information according to a state of the search tag attribute.

Preferably, according to a first possible implementation mode, in combination with the second aspect, the response unit is configured to:

when the search tag attribute is in an invalid state, transmit a response message to the AE, herein the response message is used for indicating that a notification of the original resource fails, or a creation of an attribute of the original resource fails, or an updating of the attribute of the original resource fails;

when the search tag attribute is in a valid state, transmit a resource creation request to the remote CSE, herein the resource creation request includes the address of the original resource and the search tag attribute of the original resource.

Preferably, the search tag attribute is in the invalid state including at least one of the following: the original resource not having the search tag attribute, an attribute value of the search tag attribute being empty and the attribute value of the search tag attribute being an abnormal value.

Preferably, according to a second possible implementation mode, in combination with the second aspect, the finding unit is further configured to find whether the original resource has a first indication attribute according to the address of the original resource, herein the first indication attribute represents an identity of a remote CSE which has been notified about the original resource; and the device further includes: a creation unit and an updating unit, herein the creation unit is configured to, when the finding unit finds that the original resource does not have the first indication attribute, create the first indication attribute for the original resource, and use the identity of the remote CSE which needs to be notified in the first indication information as the identity of the remote CSE which has been notified about the original resource in the first indication attribute; and the updating unit is configured to, when the finding unit finds that the original resource has the first indication attribute, update the identity of the remote CSE which has been notified about the original resource in the first indication attribute to be the identity of the remote CSE which needs to be notified in the first indication information.

Preferably, according to a third possible implementation mode, in combination with the first possible implementation mode, the finding unit is further configured to, when the finding unit finds that the search tag attribute of the original resource is deleted or emptied, continuously find a first indication attribute of the original resource; and the response unit is further configured to, when the first indication attribute is non-empty, transmit a deletion request to the remote CSE which has been notified according to the identity of the remote CSE which has been notified about the original resource in the first indication attribute.

Preferably, the deletion request includes the search tag of the original resource which is notified to the remote CSE, such that the remote CSE finds and deletes the original resource which has been notified according to the search tag.

Preferably, according to a fourth possible implementation mode, in combination with the third aspect, the receiving unit is further configured to receive an original resource updating request transmitted by the AE of the application node; and the response unit is further configured to delete or empty the search tag attribute of the original resource according to an indication in the updating request when the updating request indicates the local CSE to delete or empty the search tag attribute of the original resource.

In a third aspect, the embodiment of the present document provides a resource notification system, including an Application Entity (AE) of an application node, a local Common Service Entity (CSE) and a remote CSE, herein, the AE is configured to transmit first indication information to the local CSE, herein the first indication information includes an identity of the remote CSE which needs to be notified and an address of an original resource; and the local CSE is configured to receive the first indication information transmitted by the AE;

and find a search tag attribute of the original resource according to the address of the original resource in the first indication information, and make a response to the first indication information according to a state of the search tag attribute.

Preferably, according to a first possible implementation mode, in combination with the third aspect, when the search tag attribute is in an invalid state, the local CSE is specifically configured to transmit a response message to the AE. Herein, the response message is used for indicating that a notification of the original resource fails, or a creation of an attribute of the original resource fails, or an updating of the attribute of the original resource fails. Herein, the search tag attribute is in the invalid state including at least one of the following: the original resource not having the search tag attribute, an attribute value of the search tag attribute being empty and the attribute value of the search tag attribute being an abnormal value; and when the search tag attribute is in a valid state, the local CSE is specifically configured to transmit a resource creation request to the remote CSE, herein the resource creation request includes the address of the original resource and the search tag attribute of the original resource.

The embodiments of the present document provide a resource notification method, device and system. By means that the local CSE finds the state of the search tag attribute in the original resource of the local CSE and makes the responses according to different states, such that the local CSE notifies the original resource to the other remote CSEs only when the search tag attribute in the original resource is valid, therefore the successful creation of the original resource at the other remote CSEs is guaranteed.

SPECIFIED EMBODIMENTS

The technical solutions in the embodiments of the present document will be clearly and completely described below in combination with the drawings in the embodiments of the present document.

Figure 1:
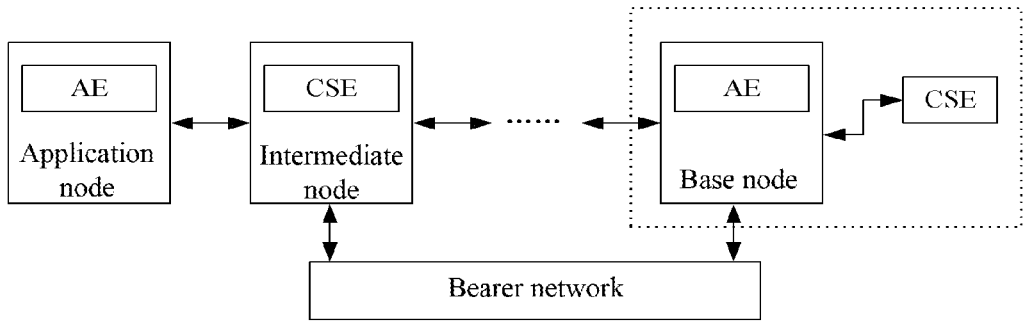
FIG. 1 illustrates a structural schematic diagram of an M2M network provided by the embodiment of the present document.

Usually, an M2M network structure may be as illustrated in FIG. 1. It can be understood that FIG. 1 only exemplarily describes the technical solution and does not represent that the technical solution of the embodiment of the present document is only applicable to the network structure illustrated in FIG. 1.

In FIG. 1, an M2M network consists of various M2M nodes and a bearer network. An M2M node at least includes an Application Entity (AE) and/or a Common Service Entity (CSE), and the M2M node may further include an application node, an intermediate node and a base node, the application node is connected with the base node through the intermediate node and the intermediate node is connected with the base node through the bearer network.

Herein, the AE at the application node needs to be registered to the CSE at the intermediate node and does not need to be registered to the CSE of the base node. It needs to be stated that, the CSE of the base node does not need to be arranged in an actual device of the base node and may also be arranged outside the actual device of the base node. Therefore, in FIG. 1, the CSE of the base node is placed outside the base node, and a dashed box is used to include the base node and the CSE of the base node to represent that the situation that the CSE of the base node is in the actual device of the base node is not excluded.

In the embodiments of the present document, unless otherwise stated, for the application node, a CSE of the intermediate node to which the AE has been registered may be called a local CSE; and CSEs of the intermediate node and the base node to which the AE has not registered may be called remote CSEs.

Figure 2:
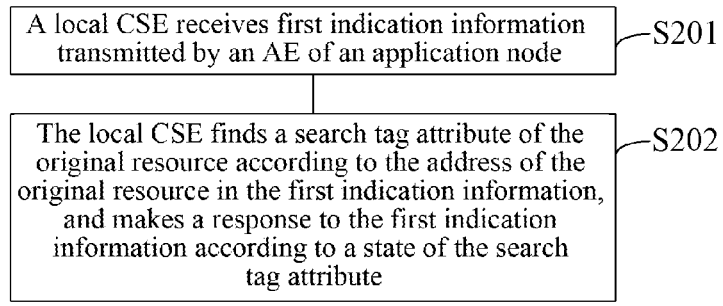
FIG. 2 illustrates a flowchart of a resource notification method provided by the embodiment of the present document.

Refer to FIG. 2, which illustrates a flowchart of a resource notification method provided by the embodiment of the present document. This example may be applied to the side of the local CSE and may specifically include:

In step S201, a local CSE receives first indication information transmitted by an AE of an application node.

Exemplarily, the first indication information is used for indicating the local CSE to notify an original resource of the local CSE to a remote CSE. The first indication information may include an identity of the remote CSE which needs to be notified and an address of the original resource. The address of the original resource is an address where the original resource is stored in the local CSE. The address of the original resource may also be used to distinguish different original resources. Specifically, the first indication information in this embodiment may be packaged in a notification resource creation request message but is not specifically limited thereto in this embodiment.

Further, after the local CSE receives the first indication information, the local CSE finds whether the original resource has a first indication attribute according to the address of the original resource. Herein, the first indication attribute represents an identity of a remote CSE which has been notified about the original resource.

when finding that the original resource does not have the first indication attribute, the local CSE creates the first indication attribute for the original resource, and uses the identity of the remote CSE which needs to be notified in the first indication information as the identity of the remote CSE which has been notified about the original resource in the first indication attribute; and when finding that the original resource has the first indication attribute, the local CSE updates the identity of the remote CSE which has been notified about the original resource in the first indication attribute to be the identity of the remote CSE which needs to be notified in the first indication information. A specific updating mode may include addition and replacement but is not specifically limited thereto in this embodiment.

In step S202, the local CSE finds a search tag attribute of the original resource according to the address of the original resource in the first indication information, and makes a response to the first indication information according to a state of the search tag attribute.

It needs to be stated that, the search tag attribute is an attribute of the original resource and an attribute value of this attribute may be a keyword used for retrieving the original resource.

Therefore, when the local CSE finds the state of the search tag attribute of the original resource according to the address of the original resource in the first indication information, the following results may occur: the search tag attribute is in a valid state or an invalid state; and specifically, the invalid state may include:

the original resource does not have the search tag attribute;

or, the original resource has the search tag attribute but an attribute value of the search tag attribute is empty;

or, the attribute value of the search tag attribute is an abnormal value, such as an abnormal value causing the occurrence of memory overflow when the attribute value is stored or the like.

The valid state may include:

the original source has the search tag attribute and the attribute value of the search tag attribute is not empty and is not an abnormal value.

Specifically, in combination with the two states of the search tag attribute, the local CSE may respectively make different responses to the first indication information according to the two different states, specifically as follows:

When the search tag attribute is in the invalid state, the local CSE transmits a response message to the AE. Herein, the response message is used for indicating that the notification of the original resource fails, or the creation of an attribute of the original resource fails, or the updating of the attribute of the original resource fails.

When the search tag attribute is in the valid state, the local CSE transmits a resource creation request to the remote CSE, such that the remote CSE creates the original resource according to the resource creation request. Herein, the resource creation request includes the address of the original resource and the search tag attribute of the original resource.

The above-mentioned process completes a process that the local CSE performs a resource notification on the remote CSE. Since in this process the local CSE finds the state of the search tag attribute in the original resource of the local CSE and makes responses according to different states, such that the local CSE does not notify the original resource to other remote CSEs when the search tag attribute in the original resource is invalid, therefore the situation that the creation failure of the original resource occurs at the other remote CSEs is avoided.

Figure 3:
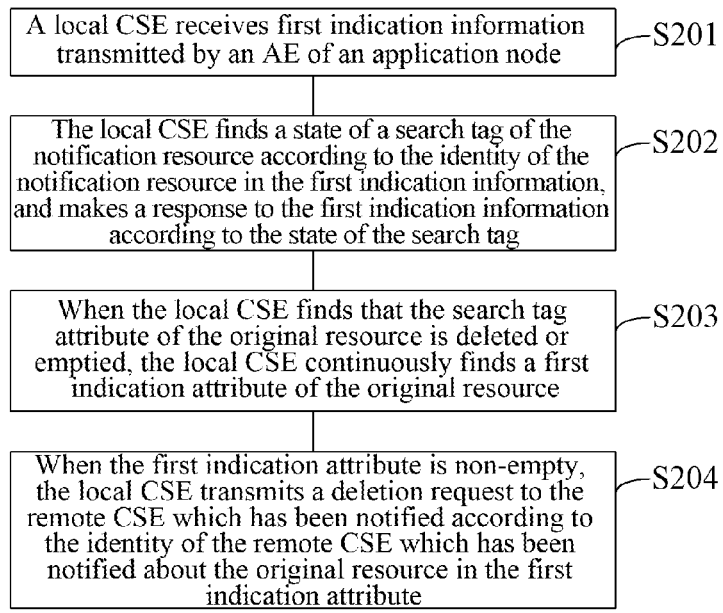
FIG. 3 illustrates a flowchart of another resource notification method provided by the embodiment of the present document.

Further, after the local CSE transmits the first indication information to the remote CSE and the remote CSE creates the original resource according to the first indication information when the search tag attribute in the original resource is valid, as illustrated in FIG. 3, the method may further include:

In step S203, when the local CSE finds that the search tag attribute of the original resource is deleted or emptied, the local CSE continuously finds a first indication attribute of the original resource.

Preferably, in this embodiment, when the local CSE receives an original resource updating request transmitted by the AE of the application node and the updating request indicates the local CSE to delete or empty the search tag attribute of the original resource, the local CSE may delete or empty the search tag attribute of the original resource according to an indication in the updating request;

or, the local CSE may determine to delete or empty the search tag attribute of the original resource according to preset rules or policies.

Specifically, after the search tag attribute of the original resource is deleted or emptied, the local CSE needs to find the first indication attribute of the original resource to expect to obtain the identity of the remote CSE which has been notified about the original resource.

In step S204, when the first indication attribute is non-empty, the local CSE transmits a deletion request to the remote CSE which has been notified according to the identity of the remote CSE which has been notified about the original resource in the first indication attribute. It can be understood that the deletion request includes the search tag of the original resource which is notified to the remote CSE.

Specifically, the deletion request may be used by the remote CSE to find and delete the original resource which has been notified according to the search tag of the original resource in the request, and this processing avoids unnecessary storage resource waste in the remote CSE.

The embodiment of the present document provides a resource notification method. By means that the local CSE finds the state of the search tag attribute in the original resource of the local CSE and makes the responses according to different states, such that the local CSE notifies the original resource to the other remote CSEs only when the search tag attribute in the original resource is valid, therefore the successful creation of the original resource at the other remote CSEs is guaranteed.

Figure 4:
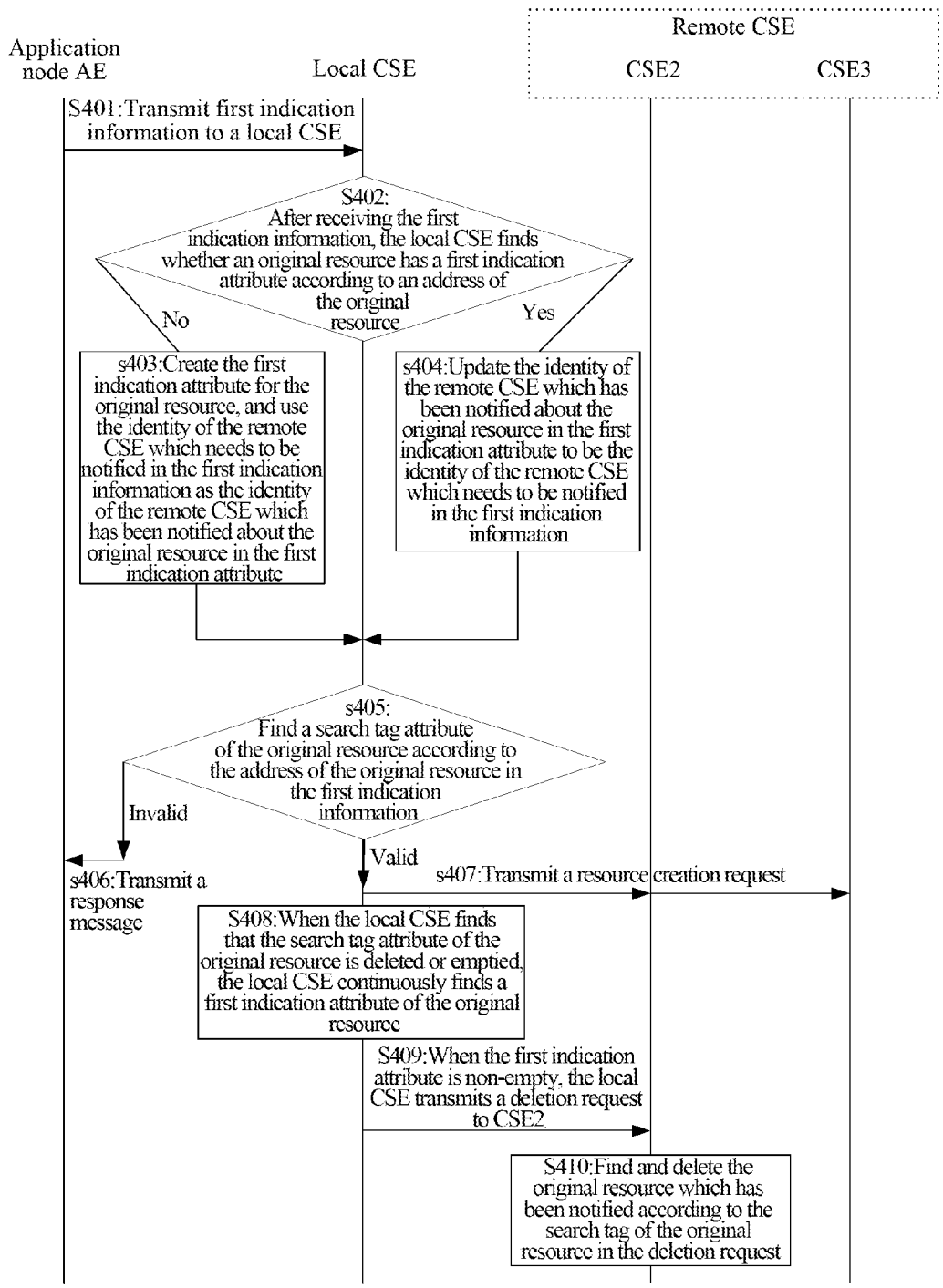
FIG. 4 illustrates a detailed flowchart of a resource notification method provided by the embodiment of the present document.

On the basis of FIG. 2 and FIG. 3, referring to FIG. 4 which illustrates a detailed flowchart of a resource notification method provided by the embodiment of the present document, the method may include:

In step S401, an AE of an application node transmits first indication information to a local CSE.

Specifically, the first indication information in this embodiment may be packaged in a notification resource creation request message which is transmitted to the local CSE by the AE of the application node. The first indication information may include an identity of a remote CSE which needs to be notified and an address of the original resource, and is used for indicating the local CSE to notify the original resource of the local CSE to the remote CSE which needs to be notified. In this embodiment, the identities of the remote CSEs in the first indication information may be CSE2 and CSE3.

In step S402, after the local CSE receives the first indication information, the local CSE finds whether the original resource has a first indication attribute according to the address of the original resource.

Specifically, the first indication attribute represents an identity of a remote CSE which has been notified about the original resource.

In step S403, when finding that the original resource does not have the first indication attribute, the local CSE creates the first indication attribute for the original resource, and uses the identity of the remote CSE which needs to be notified in the first indication information as the identity of the remote CSE which has been notified about the original resource in the first indication attribute.

In this embodiment, the local CSE may use CSE2 and CSE3 as the identities of the remote CSEs which have been notified about the original resource in the first indication attribute.

In step S404, when finding that the original resource has the first indication attribute, the local CSE updates the identity of the remote CSE which has been notified about the original resource in the first indication attribute to be the identity of the remote CSE which needs to be notified in the first indication information, and a specific updating mode may include addition and replacement but is not specifically limited thereto in this embodiment.

In this embodiment, the local CSE may update CSE2 and CSE3 to the identities of the remote CSEs which have been notified about the original resource in the first indication attribute.

In step S405, the local CSE finds a search tag attribute of the original resource according to the address of the original resource in the first indication information.

It needs to be stated that, the search tag attribute is an attribute of the original resource and an attribute value of this attribute may be a keyword used for retrieving the original resource.

Specifically, when the local CSE finds the search tag attribute of the original resource according to the address of the original resource in the first indication information, the following results may occur: the search tag attribute is in a valid state or an invalid state.

Further, the invalid state may include:

the original resource does not have the search tag attribute;

the original resource has the search tag attribute but an attribute value of the search tag attribute is empty;

or the attribute value of the search tag attribute is an abnormal value, such as an abnormal value causing the occurrence of memory overflow when the attribute value is stored.

The valid state may include:

the original source has the search tag attribute and the attribute value of the search tag attribute is not empty and is not an abnormal value.

In step S406, when the search tag attribute is in the invalid state, the local CSE transmits a response message to the AE;

herein the response message is used for indicating that the notification of the original resource fails, or the creation of an attribute of the original resource fails, or the updating of the attribute of the original resource fails.

In step S407, when the search tag attribute is in the valid state, the local CSE transmits a resource creation request to the remote CSE, herein the resource creation request includes the address of the original resource and the search tag attribute of the original resource.

In this embodiment, the local CSE transmits the resource creation requests to CSE2 and CSE3, such that CSE2 and CSE3 can create the original resource according to the resource creation requests.

After the local CSE transmits the resource creation requests to CSE2 and CSE3, and CSE2 and CSE3 can create the original resource according to the resource creation requests, the method may further include:

In step S408, when the local CSE finds that the search tag attribute of the original resource is deleted or emptied, the local CSE continuously finds a first indication attribute of the original resource.

Preferably, in this embodiment, when the local CSE receives an original resource updating request transmitted by the AE and the updating request indicates the local CSE to delete or empty the search tag attribute of the original resource, the local CSE may delete or empty the search tag attribute of the original resource according to an indication in the updating request;

or, the local CSE may determine to delete or empty the search tag attribute of the original resource according to preset rules or policies.

Specifically, after the search tag attribute of the original resource is deleted or emptied, the local CSE needs to find the first indication attribute of the original resource to expect to obtain the identity of the remote CSE which has been notified about the original resource. Here, description is made by taking an example that the identity of the remote CSE which has been notified about the original resource in the first indication attribute is CSE2.

In step S409, when the first indication attribute is non-empty, the local CSE transmits a deletion request to CSE2.

Specifically, the deletion request includes the search tag of the original resource which is notified to the remote CSE.

In step S410, CSE2 finds and deletes the original resource which has been notified according to the search tag of the original resource in the deletion request.

The embodiment of the present document provides a resource notification method. By means that the local CSE finds the state of the search tag attribute in the original resource of the local CSE and makes the responses according to different states, such that the local CSE notifies the original resource to the other remote CSEs only when the search tag attribute in the original resource is valid, therefore the successful creation of the original resource at the other remote CSEs is guaranteed.

Figure 5:
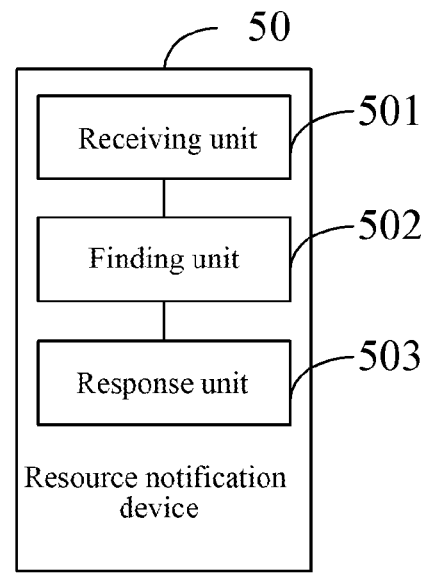
FIG. 5 illustrates a structural schematic diagram of a resource notification device provided by the embodiment of the present document.

Referring to FIG. 5 which illustrates a resource notification device 50 provided by the embodiment of the present document, the device specifically may be a CSE of an intermediate node to which an AE of an application node has been registered in the M2M network structure illustrated in FIG. 1 of this embodiment. The device may include a receiving unit 501, a finding unit 502 and a response unit 503, herein, the receiving unit 501 is configured to receive first indication information transmitted by an AE of an application node, herein the first indication information is used for indicating the device 50 to notify the original resource of the device 50 to a remote CSE, and may include an identity of the remote CSE which needs to be notified and an address of the original resource;

the finding unit 502 is configured to find a search tag attribute of the original resource according to the address of the original resource in the first indication information; and the response unit 503 is configured to make a response to the first indication information according to a state of the search tag attribute.

Exemplarily, the address of the original resource is an address where the original resource is stored in the local CSE. The address of the original resource may also be used to distinguish different original resources. Specifically, the first indication information in this embodiment may be packaged in a notification resource creation request message but is not specifically limited thereto in this embodiment.

Further, after the receiving unit 501 receives the first indication information, the finding unit 502 finds whether the original resource has a first indication attribute according to the address of the original resource. Herein, the first indication attribute represents an identity of a remote CSE which has been notified about the original resource.

Figure 6:
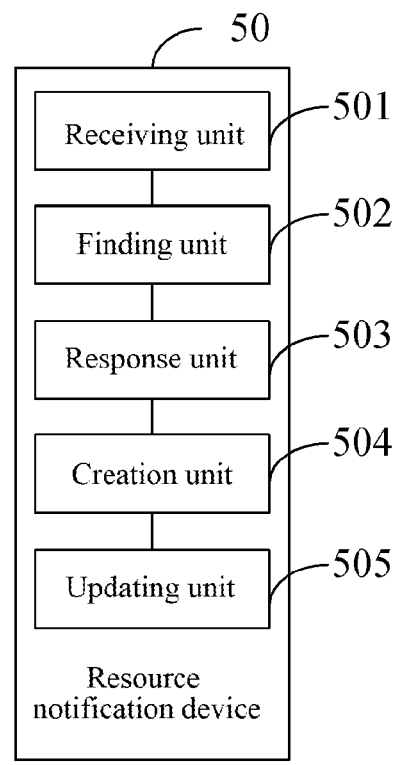
FIG. 6 illustrates a structural schematic diagram of another resource notification device provided by the embodiment of the present document.

As illustrated in FIG. 6, the device 50 further includes a creation unit 504 and an updating unit 505. Herein, the creation unit is configured to, when the finding unit 502 finds that the original resource does not have the first indication attribute, create the first indication attribute for the original resource, and use the identity of the remote CSE which needs to be notified in the first indication information as the identity of the remote CSE which has been notified about the original resource in the first indication attribute; and the updating unit 505 is configured to, when the finding unit 502 finds that the original resource has the first indication attribute, update the identity of the remote CSE which has been notified about the original resource in the first indication attribute to be the identity of the remote CSE which needs to be notified in the first indication information.

Exemplarily, the search tag attribute is an attribute of the original resource and an attribute value of this attribute may be a keyword used for retrieving the original resource.

Therefore, when the finding unit 502 finds the search tag attribute of the original resource according to the address of the original resource in the first indication information, the following results may occur: the search tag attribute is in a valid state or an invalid state; and specifically, the invalid state may include:

the original resource does not have the search tag attribute;

or, the original resource has the search tag attribute but an attribute value of the search tag attribute is empty;

or, the attribute value of the search tag attribute is an abnormal value, such as an abnormal value causing the occurrence of memory overflow when the attribute value is stored.

The valid state may include:

the original source has the search tag attribute and the attribute value of the search tag attribute is not empty and is not an abnormal value.

Specifically, in combination with the two states of the search tag attribute, the response unit 503 may respectively make different responses to the first indication information according to the two different states, specifically as follows:

When the search tag attribute is in the invalid state, the response unit 503 transmits a response message to the AE. Herein the response message is used for indicating that the notification of the original resource fails, or the creation of an attribute of the original resource fails, or the updating of the attribute of the original resource fails.

When the search tag attribute is in the valid state, the response unit 503 transmits a resource creation request to the remote CSE. Herein the resource creation request includes the address of the original resource and the search tag attribute of the original resource.

The above-mentioned process completes a process that the device 50 performs resource notification on the remote CSE. Since in this process the device 50 finds the state of the search tag attribute in the original resource of the device 50 and makes responses according to different states, such that the device 50 does not notify the original resource to other remote CSEs when the search tag attribute in the original resource is invalid, therefore the situation that the creation failure of the original resource occurs at the other remote CSEs is avoided.

Further, after the response unit 503 transmits the first indication information to the remote CSE and the remote CSE creates the original resource according to the first indication information when the search tag attribute in the original resource is valid, the finding unit 502 may further be configured to, when the finding unit 502 finds that the search tag attribute of the original resource is deleted or emptied, continuously find a first indication attribute of the original resource.

Preferably, in this embodiment, when the receiving unit 501 receives an original resource updating request transmitted by the AE of the application node and the updating request indicates the local CSE to delete or empty the search tag attribute of the original resource, the response unit 503 may delete or empty the search tag attribute of the original resource according to an indication in the updating request;

or, the response unit 503 may determine to delete or empty the search tag attribute of the original resource according to preset rules or policies.

Specifically, after the search tag attribute of the original resource is deleted or emptied, the finding unit 502 needs to find the first indication attribute of the original resource to expect to obtain the identity of the remote CSE which has been notified about the original resource.

Further, when the first indication attribute is non-empty, the response unit 503 transmits a deletion request to the remote CSE which has been notified according to the identity of the remote CSE which has been notified about the original resource in the first indication attribute, and the deletion request includes the search tag of the original resource which is notified to the remote CSE.

Specifically, the deletion request may be used by the remote CSE to find and delete the original resource which has been notified according to the search tag of the original resource in the request, and this processing may avoid unnecessary storage resource waste in the remote CSE.

The embodiment of the present document provides a resource notification device 50. By means that the finding unit 502 finds the state of the search tag attribute in the original resource of the device 50 and the response unit 503 makes the responses according to different states, such that the response unit 503 notifies the original resource to the other remote CSE only when the search tag attribute in the original resource is valid, therefore the successful creation of the original resource at the other remote CSEs is guaranteed.

Figure 7:
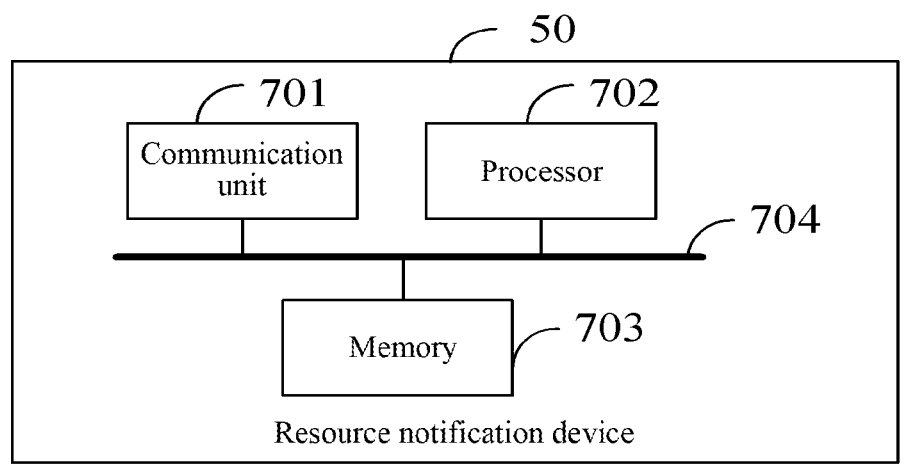
FIG. 7 illustrates a structural schematic diagram of hardware of a resource notification device provided by the embodiment of the present document.

In combination with FIG. 5 and FIG. 6, referring to FIG. 7 which illustrates a structural schematic diagram of hardware of a resource notification device 50 in this the embodiment, from FIG. 7 it can be seen that the resource notification device 50 may include at least one communication unit 701, a processor 702, a memory 703 and a bus 704, herein the at least one communication unit 701, the processor 702 and the memory 703 are connected and implement mutual communication through the bus 704.

The bus 704 may be an Industrial Standard Architecture (ISA) bus, a Peripheral Component (PCI) bus or an Extended Industry Standard Architecture (EISA) bus, etc. The bus 704 may be divided into an address bus, a data bus, a control bus, etc. In order to facilitate illustration, FIG. 7 only illustrates the bus by using a bold line, but which does not mean that there is only one bus or one type of buses. Herein, the communication unit 701 may be an antenna having electromagnetic wave receiving and transmitting functions; and the memory 703 is configured to store executable program codes including computer operation instructions. The memory 703 may include a high-speed RAM memory and may also include a non-volatile memory, such as at least one magnetic disc memory. The memory device stores an operating system, application programs and program codes used for implementing the methods or function units in the embodiments of the present document. The operating system is configured to control and implement processing functions executed by processing units. The application programs include program codes such as word processing software and email software.

The processor 702 may be a Central Processing Unit (CPU), or an Application Specific Integrated Circuit (ASIC), or one or more integrated circuits configured to implement the embodiments of the present document.

The communication unit 701 is configured to communicate with an external device; and the processor 702 is configured to receive first indication information transmitted by an AE of an application node through the communication unit 701, herein the first indication information includes an identity of the remote CSE which needs to be notified and an address of an original resource;

and find a search tag attribute of the original resource according to the address of the original resource in the first indication information, and make a response to the first indication information according to a state of the search tag attribute.

Exemplarily, the processor 702 is specifically configured to, when the search tag attribute is in an invalid state, transmit a response message to the AE of the application node through the communication unit 701, herein the response message is used for indicating that the notification of the original resource fails, or the creation of an attribute of the original resource fails, or the updating of the attribute of the original resource fails; and when the search tag attribute is in a valid state, transmit the first indication information to the remote CSE through the communication unit 701, and the processor 702 is configured as that the remote CSE creates the original resource according to the first indication information.

Exemplarily, the processor 702 is further configured to find whether the original resource has a first indication attribute according to the address of the original resource, herein the first indication attribute represents an identity of a remote CSE which has been notified about the original resource;

and when finding that the original resource does not have the first indication attribute, create the first indication attribute for the original resource, and use the identity of the remote CSE which needs to be notified in the first indication information as the identity of the remote CSE which has been notified about the original resource in the first indication attribute; and and when finding that the original resource has the first indication attribute, update the identity of the remote CSE which has been notified about the original resource in the first indication attribute to be the identity of the remote CSE which needs to be notified in the first indication information.

Further, the processor 701 is further configured to, when the processor 701 finds that the search tag attribute of the original resource is deleted or emptied, continuously find a first indication attribute of the original resource;

and when the first indication attribute is non-empty, transmit a deletion request through the communication unit 701 to the remote CSE which has been notified according to the identity of the remote CSE which has been notified about the original resource in the first indication attribute.

Figure 8:
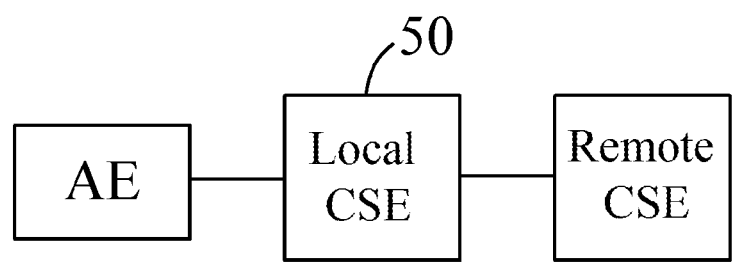
FIG. 8 illustrates a structural schematic diagram of a resource notification system provided by the embodiment of the present document.

Referring to FIG. 8 which illustrates a resource notification system provided by the embodiment of the present document, the system may include: an AE, a local CSE and a remote CSE, herein, the AE is configured to transmit first indication information to the local CSE; and the local CSE is configured to receive the first indication information transmitted by the AE of the application node, herein the first indication information includes an identity of a remote CSE which needs to be notified and an address of an original resource;

and find a search tag attribute of the original resource according to the address of the original resource in the first indication information, and make a response to the first indication information according to a state of the search tag attribute.

It needs to be stated that, when the search tag attribute is in an invalid state, the local CSE is specifically configured to transmit a response message to the AE, herein the response message is used for indicating that the notification of the original resource fails, or the creation of an attribute of the original resource fails, or the updating of the attribute of the original resource fails. herein the search tag attribute is in the invalid state including at least one of follows: the original resource does not have the search tag attribute, an attribute value of the search tag attribute is empty and the attribute value of the search tag attribute is an abnormal value; and when the search tag attribute is in a valid state, the local CSE is specifically configured to transmit a resource creation request to the remote CSE, herein the resource creation request includes the address of the original resource and the search tag attribute of the original resource.

It further needs to be stated that, the local CSE in this embodiment may be the resource notification device 50 in the foresaid embodiment and is not specifically limited here.

One skilled in the art shall understand that the embodiments of the present document may be provided in the form of methods, systems or computer program products. Therefore, the present document may adopt the form of full hardware embodiments, full software embodiments or combined software and hardware embodiments. In addition, the present document may adopt the form of computer program products implemented based on one or more of computer usable memory media (including but not limited to disk memories, optical memories, etc.) containing computer usable program codes therein.

The present document is described by referring to flowcharts and/or block diagrams of the method, the apparatus (system) and the computer program products according to the embodiments of the present document. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for implementing functions designated in one process or more processes of the flowcharts and/or one block or more blocks of the block diagrams.

These computer program instructions may also be stored in computer-readable memories which can guide computers or other programmable data processing devices to work in a specific manner, such that the instructions stored in the computer-readable memories produce products including instruction apparatuses, and the instruction apparatuses implement functions designated in one process or more processes in the flowcharts and/or one block or more blocks in the block diagrams.

These computer program instructions may also be loaded to computers or other programmable data processing devices, such that a series of operation steps are executed in the computers or other programmable devices to perform processing implemented by the computers, such that the instructions which are executed in the computers or other programmable devices provide steps for implementing functions designated in one process or more processes in the flowcharts and/or one block or more blocks in the block diagrams.

The above description is just preferred embodiments of the present document and is not used for limiting the protection scope of the present document.

INDUSTRIAL APPLICABILITY

In the technical solutions provided by the embodiments of the present document, by means that the local CSE finds the state of the search tag attribute in the original resource of the local CSE and makes the responses according to different states, such that the local CSE notifies the original resource to the other remote CSEs only when the search tag attribute in the original resource is valid, therefore the successful creation of the original resource at the other remote CSEs is guaranteed.

What is claimed is:

1. A resource notification method, comprising:
   receiving, by a local Common Service Entity (CSE), first indication information transmitted by an Application Entity (AE) of an application node, wherein the first indication information is used for indicating the local CSE to notify an original resource of the local CSE to a remote CSE, and comprises an identity of the remote CSE which needs to be notified and an address of the original resource; and
   finding, by the local CSE, a search tag attribute of the original resource according to the address of the original resource in the first indication information, and making a response to the first indication information according to a state of the search tag attribute;
   wherein finding, by the local CSE, a search tag attribute of the original resource according to the address of the original resource in the first indication information, and making a response to the first indication information according to a state of the search tag attribute comprises:
   when the search tag attribute is in an invalid state, the local CSE transmitting a response message to the AE, wherein the response message is used for indicating that a notification of the original resource fails, or a creation of an attribute of the original resource fails, or an updating of the attribute of the original resource fails;
   when the search tag attribute is in a valid state, the local CSE transmitting a resource creation request to the remote CSE, wherein the resource creation request comprises the address of the original resource and the search tag attribute of the original resource.

2. The method according to claim 1, wherein, the search tag attribute is in the invalid state including at least one of the following:
   the original resource not having the search tag attribute, an attribute value of the search tag attribute being empty and the attribute value of the search tag attribute being an abnormal value.

3. The method according to claim 1, wherein, after the local CSE receives the first indication information, the method further comprises: finding whether the original resource has a first indication attribute according to the address of the original resource, wherein the first indication attribute represents an identity of a remote CSE which has been notified about the original resource;
   when finding that the original resource does not have the first indication attribute, the local CSE creating the first indication attribute for the original resource, and using the identity of the remote CSE which needs to be notified in the first indication information as the identity of the remote CSE which has been notified about the original resource in the first indication attribute; and
   when finding that the original resource has the first indication attribute, the local CSE updating the identity of the remote CSE which has been notified about the original resource in the first indication attribute to be the identity of the remote CSE which needs to be notified in the first indication information.

4. The method according to claim 1, wherein, after the local CSE transmits the resource creation request to the remote CSE, the method further comprises:
   when the local CSE finds that the search tag attribute of the original resource is deleted or emptied, continuously finding a first indication attribute of the original resource; and
   when the first indication attribute is non-empty, the local CSE transmitting a deletion request to the remote CSE which has been notified according to the identity of the remote CSE which has been notified about the original resource in the first indication attribute.

5. The method according to claim 4, wherein,
   the deletion request comprises the search tag of the original resource which is notified to the remote CSE, such that the remote CSE finds and deletes the original resource which has been notified according to the search tag.

6. The method according to claim 4, the method further comprising:
   receiving, by the local CSE, an original resource updating request transmitted by the AE of the application node; and when the updating request indicates the local CSE to delete or empty the search tag attribute of the original resource, deleting or emptying, by the local CSE, the search tag attribute of the original resource according to an indication in the updating request; or
   deleting or emptying, by the local CSE, the search tag attribute of the original resource according to preset rules or policies.

7. A resource notification device, comprising: a receiving unit, a finding unit and a response unit, wherein,
   the receiving unit is configured to receive first indication information transmitted by an Application Entity (AE) of an application node, wherein the first indication information is used for indicating the local CSE to notify an original resource of the local CSE to a remote CSE, and comprises an identity of the remote CSE which needs to be notified and an address of the original resource;
   the finding unit is configured to find a search tag attribute of the original resource according to the address of the original resource in the first indication information; and
   the response unit is configured to make a response to the first indication information according to a state of the search tag attribute;
   wherein the response unit is configured to:
   when the search tag attribute is in an invalid state, transmit a response message to the AE, wherein the response message is used for indicating that a notification of the original resource fails, or a creation of an attribute of the original resource fails, or an updating of the attribute of the original resource fails;
   when the search tag attribute is in a valid state, transmit a resource creation request to the remote CSE, wherein the resource creation request comprises the address of the original resource and the search tag attribute of the original resource.

8. The device according to claimer 7, wherein, the search tag attribute is in the invalid state including at least one of the following:

the original resource not having the search tag attribute, an attribute value of the search tag attribute being empty and the attribute value of the search tag attribute being an abnormal value.

9. The device according to claim 7, wherein, the finding unit is further configured to find whether the original resource has a first indication attribute according to the address of the original resource, wherein the first indication attribute represents an identity of a remote CSE which has been notified about the original resource; and the device further comprises: a creation unit and an updating unit, wherein the creation unit is configured to, when the finding unit finds that the original resource does not have the first indication attribute, create the first indication attribute for the original resource, and use the identity of the remote CSE which needs to be notified in the first indication information as the identity of the remote CSE which has been notified about the original resource in the first indication attribute; and the updating unit is configured to, when the finding unit finds that the original resource has the first indication attribute, update the identity of the remote CSE which has been notified about the original resource in the first indication attribute to be the identity of the remote CSE which needs to be notified in the first indication information.

10. The device according to claim 7, wherein the finding unit is further configured to, when the finding unit finds that the search tag attribute of the original resource is deleted or emptied, continuously find a first indication attribute of the original resource; and the response unit is further configured to, when the first indication attribute is non-empty, transmit a deletion request to the remote CSE which has been notified according to the identity of the remote CSE which has been notified about the original resource in the first indication attribute.

11. The device according to claim 10, wherein, the receiving unit is further configured to receive an original resource updating request transmitted by the AE of the application node; and the response unit is further configured to delete or empty the search tag attribute of the original resource according to an indication in the updating request when the updating request indicates the local CSE to delete or empty the search tag attribute of the original resource.

12. A resource notification system, comprising an Application Entity (AE) of an application node, a local Common Service Entity (CSE) and a remote CSE, wherein, the AE is configured to transmit first indication information to the local CSE, wherein the first indication information is used for indicating the local CSE to notify an original resource of the local CSE to a remote CSE, and comprises an identity of the remote CSE which needs to be notified and an address of the original resource; and the local CSE is configured to receive the first indication information transmitted by the AE;

and find a search tag attribute of the original resource according to the address of the original resource in the first indication information, and make a response to the first indication information according to a state of the search tag attribute;

wherein, when the search tag attribute is in an invalid state, the local CSE is configured to transmit a response message to the AE, wherein the response message is used for indicating that a notification of the original resource fails, or a creation of an attribute of the original resource fails, or an updating of the attribute of the original resource fails;

when the search tag attribute is in a valid state, the local CSE is configured to transmit a resource creation request to the remote CSE, wherein the resource creation request comprises the address of the original resource and the search tag attribute of the original resource.

13. The system according to claim 12, wherein the search tag attribute is in the invalid state including at least one of the following: the original resource not having the search tag attribute, an attribute value of the search tag attribute being empty and the attribute value of the search tag attribute being an abnormal value.

* * * * *